Oct. 30, 1951  R. F. MIEHLE, JR  2,573,267
STRIP TENSIONING DEVICE

Filed Jan. 22, 1949

INVENTOR.

Robert F. Miehle, Jr.

INVENTOR.

Robert F. Miehle, Jr

Patented Oct. 30, 1951

2,573,267

UNITED STATES PATENT OFFICE 2,573,267

STRIP TENSIONING DEVICE

Robert F. Miehle, Jr., Chicago, Ill., assignor to Bell & Howell Company, Chicago, Ill., a corporation of Illinois Application January 22, 1949, Serial No. 72,121

9 Claims. (Cl. 271—2.3)

My invention relates particularly to the drive of sound record strips such as the photographic sound and picture record film strips which are used in the production of sound accompanied motion pictures although not limited to this use alone.

The main object of the invention resides in the provision of novel, simple and effective drive mechanism involving a driven strip or belt engaging over a rotatable drum or pulley, which promotes accurately uniform constant movement of the strip over the drum and corresponding uniform rotation of the drum, to the instant end of promoting such accurately uniform constant drive of a feed perforated photographic sound record film strip past a translating station operatively related with the strip at a point where the strip passes over a "sound" drum for reducing or eliminating distortion incident to irregular movement of the strip past the translating station.

The invention will be better understood by reference to the accompanying drawing forming a part hereof and in which—

Figure 1:
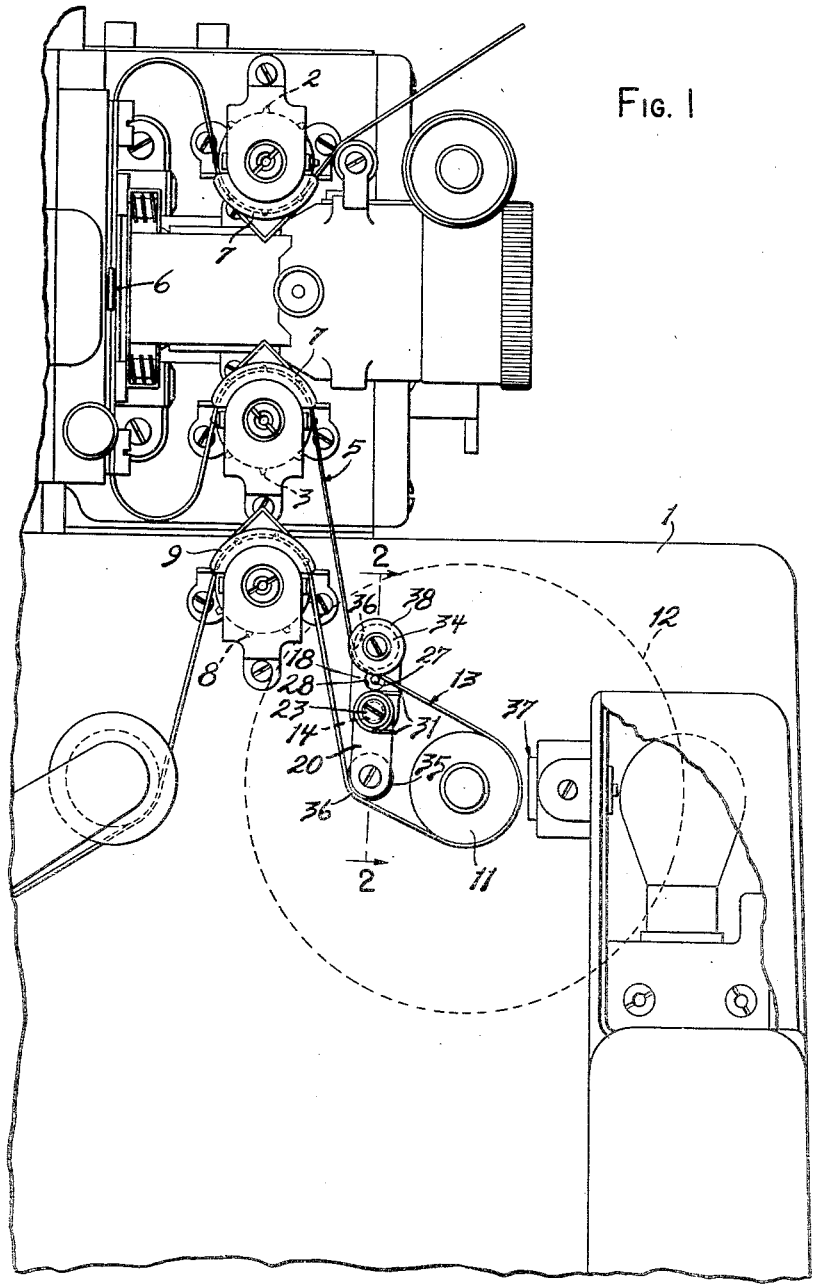
Figure 1 is a partial side elevation of a sound motion picture projecting machine embodying my invention.
Figure 2:
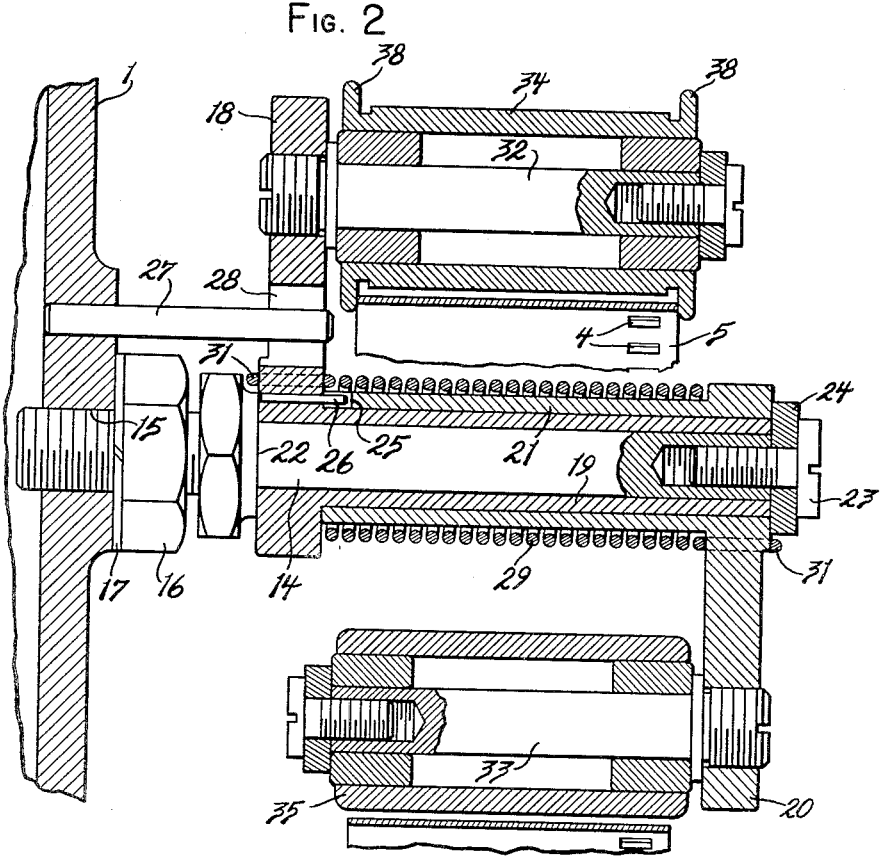
Figure 2 is a partial sectional view substantially on the line 2—2 of Figure 1.

Referring to the drawing, 1 designates the frame of a sound motion picture projecting machine, see Figures 1 and 2, and disposed upwardly on the frame is a usual motion picture mechanism including two vertically spaced rotatable constant feed sprockets 2 and 3 which engage usual feed perforations 4 of a motion picture and sound record bearing photographic film strip 5 and feed it to and from a projection apertured intermittent feed guide 6 wherein the film is fed intermittently in a downward direction by a usual intermittent feed mechanism not shown, the film being retained in engagement with the sprockets 2 and 3 by usual releasable retaining devices 7.

A third rotatable constant feed sprocket 8 is mounted on the frame 1 below the sprocket 3 and engages the feed perforations of the film strip 5 for further constantly feeding the same, the film strip being retained in engagement with the sprocket 8 by a usual releasable retaining device 9. The sprockets 2, 3 and 8 are driven in unison to feed the film strip at the same rate by a usual driving mechanism not shown.

A "sound" drum 11 is rotatably mounted in a usual manner on the frame 1 on an axis in parallelism with those of the sprockets 2, 3 and 8, a flywheel 12 being connected with the drum to augment the momentum thereof as is usual.

The sprockets 3 and 8 in their feed engagement of the film strip 5 serve for constantly feeding the film strip in a loop 13 about and rotating the drum 11, see Figure 1, these sprockets respectively engaging the film strip at the ends of the loop and consequently being operative on the film strip on both sides of the drum.

A stationary bearing stud 14 is disposed within the loop 13 intermediate and in parallelism with the drum 9 and the sprockets 3 and 8, and its inner end is screwthreaded into the frame 1, as designated at 15 in Figure 2, and is secured in longitudinally adjusted position by means of a lock nut 16 screwthreaded on the stud and clamping a lockwasher 17 between it and the frame.

Figure 3:
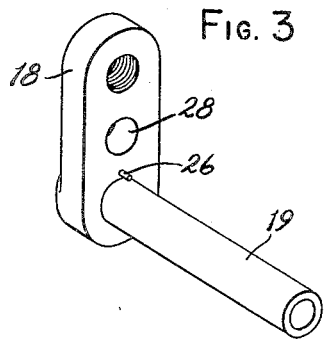
Figures 3 and 4 are perspective views respectively of the two tension transmitting arms of the mechanism.

An arm 18 is provided at one end with a sleeve 19 formed integrally therewith and projecting laterally thereof, and the bore of this sleeve is pivotally engaged on the stud 14 with the arm adjacent the frame and the sleeve extending outwardly therefrom. See Figures 2 and 3.

Figure 4:
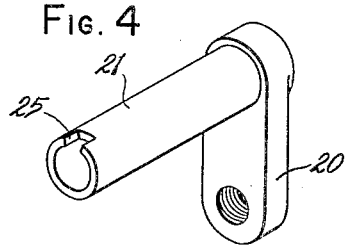

Another arm 20 is provided at one end with a sleeve 21 formed integrally therewith and projecting laterally thereof, and this sleeve being larger than the sleeve 19, the bore of the sleeve 21 is pivotally engaged on the sleeve 19 with the arm 20 at the outer or frame remote end of the stud 14, see Figures 2 and 4.

The stud 14 is provided with an outwardly facing shoulder 22 spaced inwardly from the outer end thereof, and this shoulder is inwardly engaged by the inner arm 18. The projecting end of the sleeve 21 inwardly engages against the arm 18, and a headed screw 23 is screwthreaded into the outer end of the stud 14 and clamps a washer 24 thereagainst, and the arm 20 and sleeve 19 outwardly engage against this washer, these engagements providing axial thrust bearings for the arms 18 and 20 so that they are confined axially on the stud 14. As so mounted, the arms 18 and 20 are mounted for independent pivotal movement in coaxial relation, the arms being spaced axially of their pivotal axis and the stud 14 and the sleeves 19 and 21 extending between the arms. The arms extend vertically and oppositely from their pivotal axis, and are maintained in such angularly displaced relation while being permitted a suitable range of relative pivotal movement, see Figures 2, 3 and 4, by means of a circumferentially extending slot 25 on the projecting end of the sleeve 21 and a pin or lug 26 on the arm 18 and projecting into the slot and thus limiting relative movement of the arms 18 and 20 by alternate engagement of the pin with the ends of the slot. The arm 18 extends upwardly and it is so maintained while being permitted a suitable range of pivotal movement relative to the frame 1, see Figures 1, 2 and 3, by means of a pin 27 fixed on the frame 1 and extending into a relatively large aperture 28 through the arm 18 and thus limiting pivotal movement of this arm by alternate engagement with opposite portions of the aperture wall, the arm 20 being maintained extending downwardly by the arm 18 being maintained extending upwardly and by the engagement of the pin 26 in the slot 25.

A helical torsion spring 29 surrounds the stud 14 and the sleeves 19 and 21 between the arms 18 and 20, and its ends are in the form of hooks 31, see Figures 1 and 2, which are respectively engaged with the arms 18 and 20 so that the spring is operative between the arms to relatively yieldably urge the arms as hereinafter described.

Vertically spaced bearing studs 32 and 33 are respectively secured on the arms 18 and 20 in radially and oppositely spaced parallel relation with the pivotal axis of the arms and extend between the planes of pivotal movement of the arms, and rollers 34 and 35 are respectively rotatably mounted on the studs 32 and 33 and are thus disposed in the same relation with the arms and the pivotal axis of the arms as are the studs.

The rollers 34 and 35 respectively engage the two stretches of the film strip between the drum 11 and the sprockets 3 and 8 in spaced relation with the drum and these sprockets and in opposite directions angularly about the pivotal axis of the arms 18 and 20 or to the left in Figure 1, and the spring 29 relatively yieldably urges these arms and rollers to tension the rollers against and form bights 36 in said stretches.

Accordingly, variations in tension of the stretches of the film strip between the drum 11 and the sprockets 3 and 8 are transmitted, through the arms 18 and 20 and the spring 29, which may freely oscillate as a unit on the stud 14, from one to the other of these stretches to the end of maintaining tension balance between these stretches and minimizing interference with uniform rotation of the drum and movement of the portion of the film strip engaged thereon, the momentum of the drum and/or its flywheel or equivalent tending to maintain the rate of rotation of the drum.

A usual optical slit translating device or "sound pick up," generally designated at 37 in Figure 1, has operative relation with the film strip while engaged on the sound drum 11.

The stop means operative between the arms 18 and 20 and comprising the lug 26 engaged in the slot 25 and the stop means operative between the arm 18 and the frame 1 and comprising the pin 27 engaged in the aperture 28, as hereinbefore described, serve to facilitate proper lacing of the film strip on the sprockets 3 and 8, the rollers 32 and 33 and the drum 11 by limiting the movement of the arms about their pivotal axis, and when the film strip is properly laced on the sprockets 3 and 8, the rollers 32 and 33 and the drum 11, the lug 26 is disposed intermediate the ends of the slot 25 and the pin 27 is disposed intermediate the aperture 28 so that neither of these stop means interferes with free movement of the arms 18 and 20 throughout ranges of movement of the arms necessary for the proper functioning of the mechanism.

The upper roller 34 is provided with circumferential flanges 38 spaced longitudinally thereof, which confine the film strip therebetween, and the film strip is adjusted laterally to aline a sound record on the film strip with the translating device 37 by rotating the stud 14 to adjust it longitudinally in its screwthread mounting 15 on the frame 1 and locking it in adjusted position by the lock nut 16, it being observed that the arms 18 and 20 and the rollers 34 and 35 are correspondingly adjusted with the stud 14.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combination with a rotatable drum, of constant feed means for feeding a strip about said drum and operative on the strip on both sides of said drum, and means operative to transmit tension from one to the other of the two stretches of the strip between said feed means and drum comprising two arms mounted for independent pivotal movement in substantially coaxial relation and at points thereon radially and oppositely spaced from their pivotal axis, having tensioning operative relation respectively with said stretches in spaced relation with said feed means and drum and in opposite directions angularly about said axis, and a resilient connection between said arms and relatively yieldably urging the same angularly about said axis to tension said stretches.

2. In a device of the character described, the combination with a rotatable drum, of constant feed sprocket means for feeding a feed perforated strip about said drum and operative on the strip on both sides of said drum, and means operative to transmit tension from one to the other of the two stretches of the strip between said feed means and drum comprising two arms mounted for independent pivotal movement in substantially coaxial relation, two rollers respectively rotatably mounted on said arms in radially and oppositely spaced relation with the pivotal axis of said arms and respectively engageable against said stretches in spaced relation with said feed means and drum and in opposite directions angularly about said axis, said arms being spaced along their pivotal axis and the pivotal mounting of said arms comprising a stud extending along said axis between said arms, and a helical torsion spring surrounding said stud between said arms and having its ends respectively engaged with said arms and relatively yieldably urging the same angularly about said axis to tension said rollers against and form bights in said stretches.

3. In a device of the character described, the combination with a rotatable drum, of constant feed means for feeding a strip about said drum and operative on the strip on both sides of said drum, and means operative to transmit tension from one to the other of the two stretches of the strip between said feed means and drum comprising two arms mounted for independent pivotal movement in substantially coaxial relation and at points thereon radially and oppositely spaced from their pivotal axis, having tensioning operative relation respectively with said stretches in spaced relation with said feed means and drum and in opposite directions angularly about said axis, said arms being spaced along their pivotal axis and the pivotal mounting of said arms comprising a stud extending along said axis between said arms and sleeves respectively fixed on said arms and disposed therebetween and surrounding said stud and the bore of at least one of said sleeves being pivotally engaged on said stud, and a helical torsion spring surrounding said stud and sleeves between said arms and having its ends respectively engaged with said arms and relatively yieldably urging the same angularly about said axis to tension said stretches.

4. In a device of the character described, the combination with a rotatable drum, of constant feed sprocket means for feeding a feed perforated strip about said drum and operative on the strip on both sides of said drum, and means operative to transmit tension from one to the other of the two stretches of the strip between said feed means and said drum comprising two arms mounted for independent pivotal movement in substantially coaxial relation, two rollers respectively rotatably mounted on said arms in radially and oppositely spaced relation with the pivotal axis of said arms and respectively engageable against said stretches in spaced relation with said feed means and drum and in opposite directions angularly about said axis, said arms being spaced along their pivotal axis and the pivotal mounting of said arms comprising a stud extending along said axis between said arms and sleeves respectively fixed on said arms and extending therebetween and surrounding said stud and the bore of one of said sleeves being pivotally engaged on said stud and the bore of the other of said sleeves being pivotally engaged on said one sleeve, and a helical torsion spring surrounding said stud and sleeves between said arms and having its ends respectively engaged with said arms and relatively yieldably urging the same angularly about said axis to tension said rollers against and form bights in said stretches.

5. In a device of the character described, the combination of claim 1 and further including a frame carrying said feed means, drum and arms, stop means limiting pivotal movement of one of said arms relative to said frame, and a second stop means operative between said arms and limiting relative pivotal movement thereof.

6. In a device of the character described, the combination of claim 3 and further including a frame carrying said feed means, drum and arms, stop means limiting pivotal movement of one of said arms relative to said frame, and a second stop means associated with one of said sleeves and operative between said arms and limiting relative pivotal movement thereof.

7. In a device of the character described, the combination of claim 4 and further including a frame carrying said feed means, drum and arms, stop means limiting pivotal movement of one of said arms relative to said frame, and a second stop means operative between said arms and limiting relative pivotal movement thereof and comprising a circumferentially extending slot on the projecting end of said other sleeve and a stop lug projecting into said slot.

8. In a device of the character described, the combination of claim 2 and further including one of said rollers being provided with circumferential flanges spaced longitudinally thereof and between which the strip is confined, a frame carrying said feed means and drum, and an adjustable mounting carrying said stud for longitudinal adjustment on said frame.

9. In a device of the character described, the combination of claim 2 and further including one of said rollers being provided with circumferential flanges spaced longitudinally thereof and between which the strip is confined, a frame carrying said feed means and drum, said stud having an end screwthreaded into said frame for longitudinal adjustment, and a lock nut screwthreaded on said stud for securing said stud in adjusted position.

ROBERT F. MIEHLE, Jr.

REFERENCES CITED

The following references are of record in the file of this patent:

UNITED STATES PATENTS

| Number | Name | Date |
|---|---|---|
| 1,831,562 | Heisler | Nov. 10, 1931 |
| 2,248,106 | McNabb | July 8, 1941 |
| 2,442,400 | Collins | June 1, 1948 |